(12) United States Patent
Rotondo et al.

(10) Patent No.: US 7,853,780 B2
(45) Date of Patent: Dec. 14, 2010

(54) CORE INITIALIZATION CODE VALIDATION

(75) Inventors: Scott A. Rotondo, Mountain View, CA (US); Casper H. Dik, Amsterdam (NL); Joep J. Vesseur, Amstelveen (NL)

(73) Assignee: Oracle America, Inc., Redwood City, CA (US)

( * ) Notice: Subject to any disclaimer, the term of this patent is extended or adjusted under 35 U.S.C. 154(b) by 173 days.

(21) Appl. No.: 12/183,859

(22) Filed: Jul. 31, 2008

(65) Prior Publication Data
US 2010/0031012 A1 Feb. 4, 2010

(51) Int. Cl.
*G06F 9/445* (2006.01)
(52) U.S. Cl. .......................................... 713/2
(58) Field of Classification Search ............ 713/2
See application file for complete search history.

(56) References Cited

U.S. PATENT DOCUMENTS 5,844,986 A * 12/1998 Davis .................... 713/187
7,424,398 B2 * 9/2008 Booth et al. ............ 702/186
2007/0208926 A1 * 9/2007 Grieve et al. ............ 713/1

* cited by examiner

*Primary Examiner*—Melvin Marcelo
(74) *Attorney, Agent, or Firm*—Marsh Fischmann & Breyfogle LLP; Karl A. Dierenbach; Kent A. Lembke

(57) ABSTRACT

Files essential to the boot sequence are validated as they are executed. As core boot files are loaded and executed by a computers a hash of the files is created and extended into configuration registers. Core operating system files are verified by the boot loader using a digital signature, and the public key used to verify the digital signature is recorded in a configuration register. Core operating system files verified by the boot loader include a list of hash values, which is used by the operating system to validate the other files as they are executed. User assurance that the system has booted correctly is achieved by comparing the state of configuration registers to previously stored values reflecting the expected state of the registers. Upon the state of the configuration registers matching what is expected, data previously selected by the user is retrieved and recognized by the user.

8 Claims, 3 Drawing Sheets

CORE INITIALIZATION CODE VALIDATION

BACKGROUND OF THE INVENTION

1. Field of the Invention

Embodiments of the present invention relate, in general, to validation of software and particularly to the validation of code that initializes a computer system.

2. Relevant Background

Computer platforms are widely available and are central to the growing reliance on electronic business and commerce in the present economy. This growth is coupled with the need to protect information, particularly information with regard to the type of computers utilized on a day-to-day basis. Although businesses now use secure operating systems on servers and have physically protected individual server platforms, a corresponding improvement in client platforms has failed to occur because of the ad hoc way in which client platforms develop, the sheer number of such platforms, and the cost.

As conventional businesses increasingly depend on personal computers ("PCs") and the Internet for their success, the trustworthiness of PCs and other platforms is an increasingly vital issue. The development of e-services and the convenience of using the same computer platform for both personal and business activities mean that users increasingly need to store and use sensitive data on these platforms. However, the ability to protect a PC or other computing platform through software alone has inherent weaknesses. The degree of confidence in software-only security solutions depends on their correct installation and operation. Even the most robust and tightly controlled software cannot vouch for its own integrity.

For example, if malicious software has bypassed the security mechanisms of an operating system ("OS") and managed to corrupt the basic behavior of the OS, by definition it is impossible to expect that the OS will necessarily be aware of this security breach. To address this need the concept of a Trusted Platform Module was created.

A Trusted Platform Module ("TPM") is generally known to one skilled in the art as a secure storage chip for unique Public Key Infrastructure ("PKI") key pairs and credentials. In other words, it is the "safety box" where keys of encrypted data can be kept. The TPM also contains protected registers that can store software measurements in the form of cryptographic hashes of executable code or configuration data. The stored values can be extended with additional measurements, but existing measurements cannot be overwritten except by resetting the computer system. Thus the TPM presents a simple interface for binding data to the current platform configuration.

Upon generation of a key or certificate for encrypted data by system software, those keys and certificates are sealed in the TPM. These stored information bits authenticate and provide information on the integrity of the platform when needed and inform the user of the status of particular pieces of hardware or software. The status is provided based on the uniqueness of the platform, which, in turn, is based on the unique keys stored in the TPM.

For example, when the TPM protected object is created, the creator indicates the software state that must exist if the secret is to be revealed. When a TPM unwraps the TPM protected object (within the TPM and hidden from view), the TPM checks that the current software state matches the indicated software state. If they match, the TPM permits access to the secret. If they do not match, the TPM denies access to the secret.

Sealing encrypts data in such a way that it may be decrypted only if the TPM releases the associated decryption key, which it only does when the exact same software is present as was specified when the data was encrypted.

However, lacking in the TPM architecture is a validation of the underlying boot sequence of a computer. Current implementation of TPM architecture and the like is limited to controlling access to data after the operating system has booted. The boot sequence itself remains vulnerable to attack, and should it be attacked by malicious code the trustworthiness of the entire platform is jeopardized. Furthermore, there is no protection against the modification of code, be it either by accident or via a malicious act, after an initial validation but prior to the code's execution.

SUMMARY OF THE INVENTION

Files essential to the boot sequence of a computer are validated as they are executed according to one embodiment of the present invention. As core boot components are loaded and executed by a computer, a hash of each computer file is created. Registers are extended with each hash value until a final value is reached representing a hash of all the values used to extend the register. The set of files comprising the core of the operating system is verified by the boot loader using a digital signature. The public key used to verify the digital signature is recorded in a configuration register. User assurance that the system has booted correctly is achieved by company the state of configuration registers to previously stored values reflecting the expected state of the registers. Upon the state of the configuration registers matching what is expected, data previously selected by the user is retrieved and recognized by the user. The core operating system files verified by the boot loader includes a list of hash values, which is used by the operating system to validate other files as they are executed.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
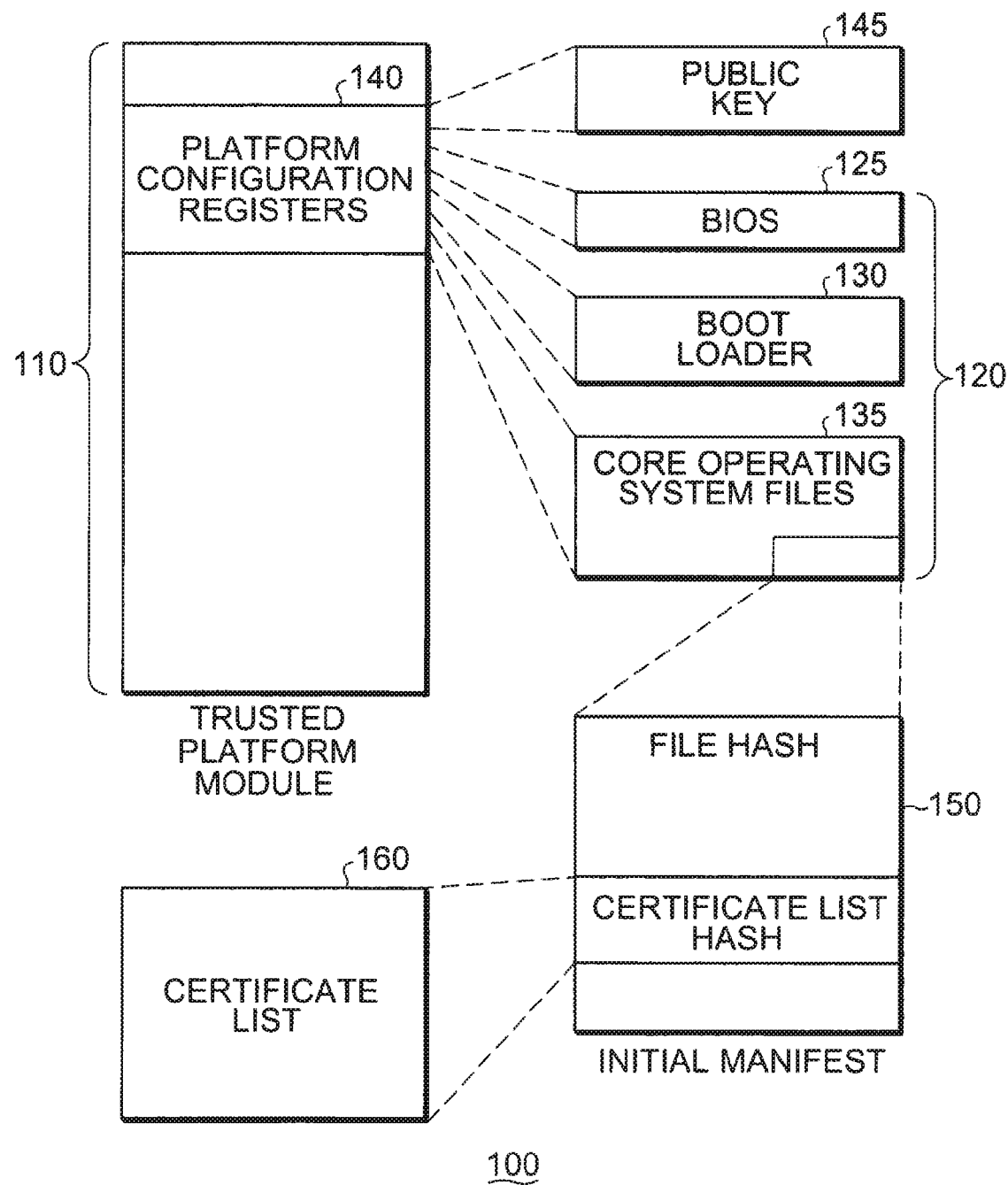
FIG. 1 shows a high level block diagram of a system for validating core boot components, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Files core to the operation of a computer system are validated at the time of execution. According to one embodiment of the present invention, core boot components that are being loaded for execution are validated. Once validated, a manifest list of hash values for programs and objects files are used to validate other code prior to execution. Entities that cause code to be loaded and executed, such as the kernel and run-time loader, verify code prior to said code's execution. A chain of trust is developed wherein each code component is validated by a previously validated component. To preserve the reliability of the present system, the core boot components are validated by comparing hash values of the core files loaded into registers with the known values reflecting the state of the registers.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 is a high level block diagram of a functional architecture for validating core boot files according to the present invention. As shown, hash values generated from core boot files 120 are loaded into a trusted environment 110. Included in the core boot files is an initial manifest list 150 containing hash values of key programs responsible for the operation of a computer system. The core boot files include, according to one embodiment of the present invention, the basic input/output system ("BIOS") 125, the boot loader 130, the primary executable and configuration files of an operating system 135. The hash of a public key 145 is also loaded into the trusted environment 110.

Upon initial power up of a computer system, core files are loaded and executed by the processor. These files include the BIOS 125, the boot loader 130, and the primary components of the operating system 135. While other files may be considered essential to the operating of a computer, these files lay the foundation for other computer system and object files that follow. As the validation of subsequent files rests on the validity of these core files, their validation is of primary importance.

According to one embodiment of the present invention, a hash value for each core boot file is loaded into the configuration registers 140 of a trusted environment 110 as the files are loaded for execution. By generating a hash value from the files as the files are being loaded, the integrity of the file is not susceptible to malicious code or to other modification of the code that would render the code's validity suspect. By comparing the generated hash value of these core boot components 120 to previously generated and sealed hash values of the same files, the validity of the newly loaded core boot components can be validated.

The trusted environment 110, according to one embodiment of the present invention, is a TPM. While the invention herein is described with reference to a TPM, one skilled in the relevant art will appreciate that the scope and intent of the present invention is not tied to the use of a TPM. Indeed the implementation methodologies for the present invention can be accomplished using other trusted environments. These implementation methodologies are known within the art and the specifics of their application within the context of the present invention will be readily apparent to one of ordinary skill in the relevant art in light of this specification.

According to one embodiment of the present invention and as shown in FIG. 1, the boot loader verifies the digital signature of the core operating system files before execution and loads a hash of the public key 145 used to verify the digital signature in a register within the trusted environment 110. Responsive to the registers containing hashes of the public key 145, BIOS 125, and boot loader 130 holding values previously specified by the user, the trusted environment 110 will release data previously stored by the user. The release of this data provides assurance to the user that the system has been booted with trustworthy code. It will be understood that checking the register containing the hash of the public key 145 instead of the core operating system files 135 allows the user to use the same stored data to verify a plurality of operating system environments provided they have all been signed using the public key 145.

As with the core boot components 120, the system continues to initialize using files listed in the initial manifest 150. As files are being loaded and executed, a hash of the file is generated. The generated hash is then compared to a hash resident in the initial manifest 150. In this manner every file, from the core boot components 120 to the files listed in the initial manifest, is validated at the time of execution. Based on this type of validation the integrity and validity of the code that will validate the rest of the system can be relied upon.

The present invention may be implemented on a conventional or general-purpose computer system, such as an IBM-compatible PC, a laptop computer, a notebook computer, a handheld or pocket computer, and/or a server computer as well as embedded systems. Such a computer system typically comprises a central processing unit(s) ("CPU") or processor(s) coupled to a random-access memory ("RAM"), a read-only memory ("ROM"), a keyboard, a printer, a pointing device a display or video adapter connected to a display device, a removable (mass) storage device (e.g., floppy disk, CD-ROM, CD-R, CD-RW, DVD, or the like), a fixed (mass) storage device (e.g., hard disk), a communication ("COMM") port(s) or interface(s), a modem, and a network interface card ("NIC") or controller (e.g., Ethernet).

The CPU communicates with other components of the system via a bi-directional system bus (including any necessary input/output ("I/O") controller circuitry and other "glue" logic). The bus, which includes address lines for addressing system memory, provides data transfer between and among the various components. RAM serves as the working memory for the CPU. The ROM contains the BIOS—a set of low-level routines in the ROM that application programs and the operating systems can use to interact with the hardware, including reading characters from the keyboard, outputting characters to printers, and so forth.

Mass storage devices provide persistent storage on fixed and removable media, such as magnetic, optical, or magnetic-optical storage systems, flash memory, or any other available mass storage technology. The mass storage may be shared on a network, or it may be a dedicated mass storage. Fixed storage can store a body of a program and data for directing operation of the computer system, including an operating system, user application programs, driver and other support files, as well as other data files of all sorts. Typically, the fixed storage serves as the main hard disk for the system.

In basic operation, program logic (including that which implements methodology of the present invention described below) is loaded from the removable storage or fixed storage into the main (RAM) memory, for execution by the CPU. During operation of the program logic, the system accepts user input from a keyboard and pointing device, as well as speech-based input from a voice recognition system.

The system itself communicates with other devices (e.g., other computers) via the NIC connected to a network (e.g., Ethernet network, Bluetooth wireless network, or the like), and/or modem (e.g., 56K baud, ISDN, DSI, or cable modem). The system may also communicate with local occasionally-connected devices (e.g., serial cable-linked devices) via the COMM interface, which may include a RS-232 serial port, a Universal Serial Bus ("USB") interface, or the like. Devices that will be commonly connected locally to the interface include laptop computers, handheld organizers, digital cameras, and the like.

Figure 2A:
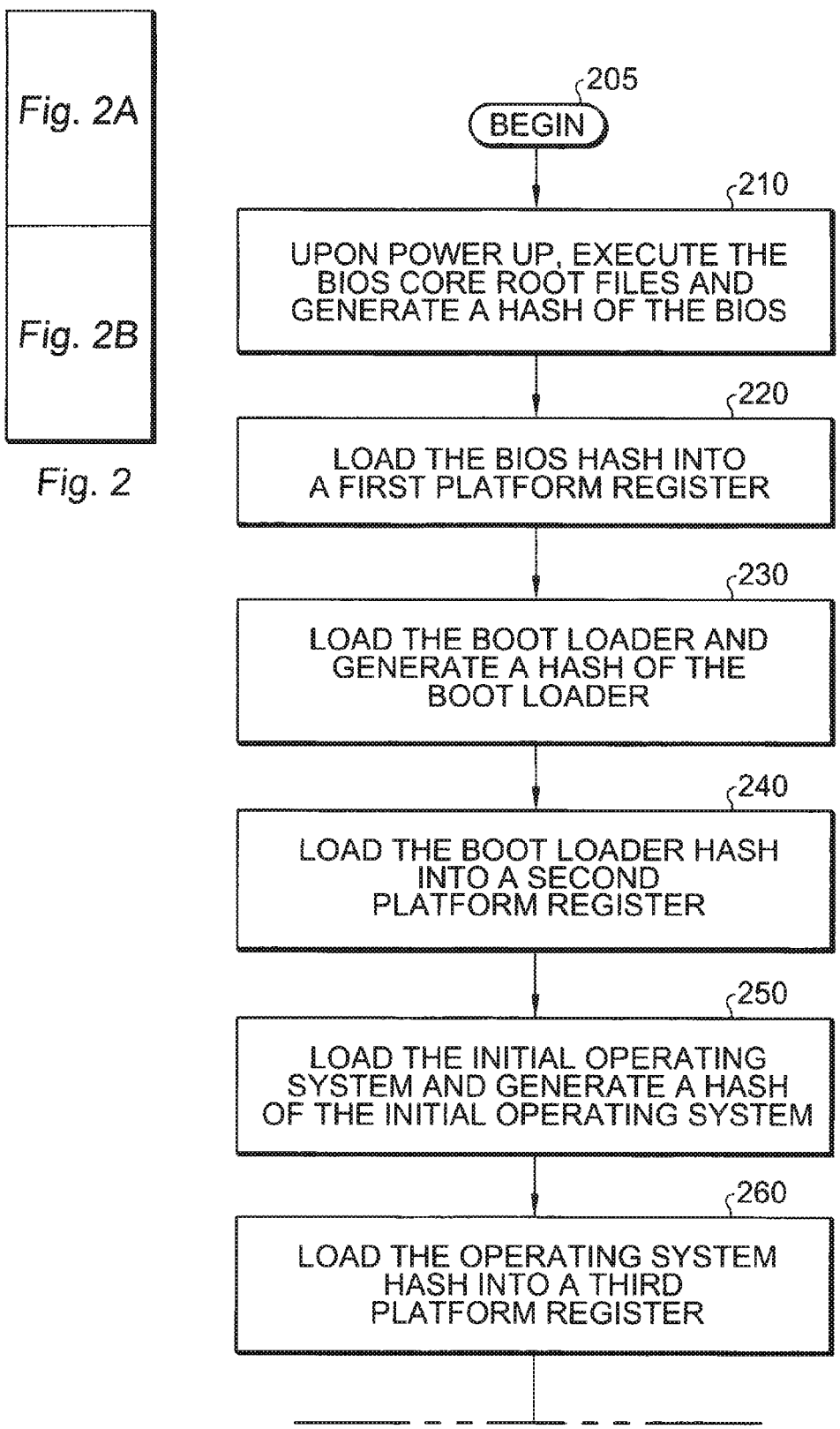
FIG. 2 is a flowchart showing one method embodiment for validating core boot components according to the present invention.
Figure 2B:
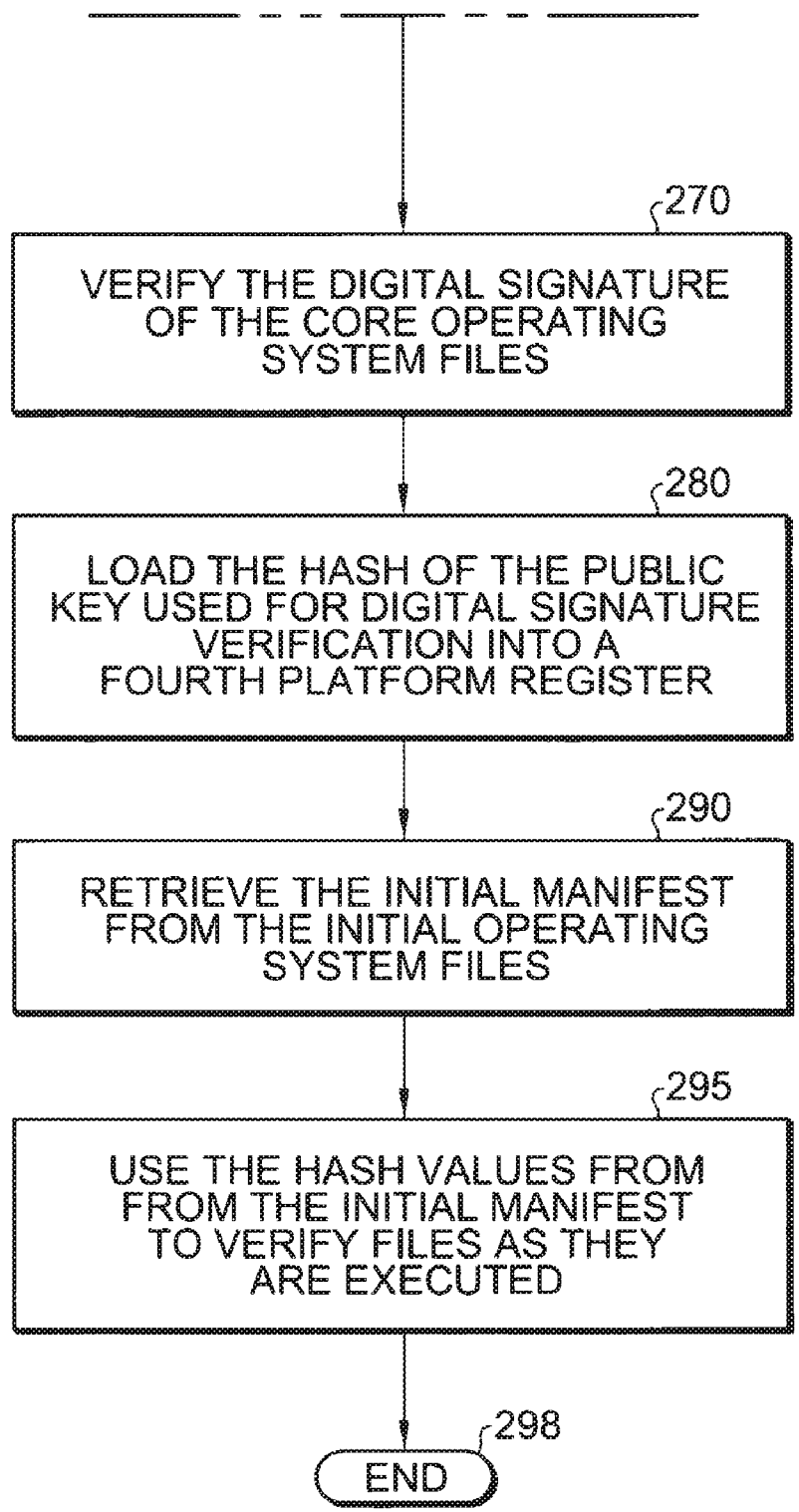

FIG. 2 is a flowchart illustrating methods of implementing an exemplary process for validating core boot components in a computer system. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing, the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems that perform the specified functions or steps, or combinations of special purpose hardware and computer instructions.

The validation process begins 205 upon power up of a computer. Immediately upon power up, the CPU starts executing code located in the non-volatile part of the BIOS 210. The non-volatile BIOS bootstrapping code calculates a hash of the programmable part of the BIOS and stores it in a first platform register. Input/Output components BIOSes are subsequently checked and the relevant platform registers are extended with their checksums. Shortly thereafter code of the boot loader is loaded and executed. As the code of the boot loader is loaded, a hash is generated and stored 240 in a second platform register. Finally the initial portions or kernel of the operating system is loaded 250. During the load, a hash of the kernel files is created and stored 260 in a third platform register. The boot loader verifies the digital signature of the core operating system files 270 and stores a hash of the public key used to verify the digital signature in a fourth platform register 280.

When the core boot components begin to execute, three platform registers possess hash values corresponding to each core boot file and a fourth register contains the public key used to verify the digital signature of the core operating system files. While in this embodiment of the present invention three registers are utilized one skilled in the relevant art will recognized that this number is merely illustrative and more or fewer registers can be used without affecting the scope of the present invention. Included in the core operating system files is a trusted hash value of the initial manifest. The initial manifest is a file that includes, for each file, a full pathname, basic file metadata, a cryptographic hash of the entire file contents, and, for some files, cryptographic hash values of loadable sections. These values are used to validate all of the files loaded subsequent to the loading of the core boot components.

The operating system kernel retrieves the initial manifest from the core operating system files 290. The operating system uses the hash values found in the initial manifest to verify files as they are executed 295, thus ending 298 the boot file validation process.

At the conclusion of the boot file validation process, the first, second, and fourth platform registers contain hash values that are sufficient to ensure that the system has been booted correctly. At any time after the system is booted, data previously selected and stored by the user can be retrieved, responsive to the expected values being found in the platform registers. Recognition of the previously selected data by the user provides assurance that the system has booted correctly.

Embodiments of the present invention enable the validation of computer files, programs, and objects immediately prior to execution. As previously discussed, from the time a file is validated to the time it is executed it may be altered either by an attack from malicious code or by simple error. Regardless of what causes the code to be altered, the result is the same; code inappropriately thought to be valid is executed producing unreliable results. To address this issue, embodiments of the present invention validate code as it is being loaded for execution. Thus, once loaded and validated by methods disclosed herein, the code is trusted by the system.

The foundation of this system lies in the ability of the present invention to validate the essential core files to any computer system. These files include the BIOS, the boot loader, and the kernel of the operating system. Using a predefined and sealed expected states of registers, the core boot components of any system can be validated as they are loaded onto a computer for execution. Using this validation, the remaining files and objects can be validated thus significantly enhancing the reliability of the computer-system.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with validation of core boot components, it is to be clearly understood that the foregoing description is made only by way of example and riot as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer system for validating initializing code, the computer system comprising:
   a central processing unit capable of executing instructions embodied as software; and
   a plurality of software portions, wherein
   a first one of said software portions is configured to initiate loading of core boot components;
   a second one of said software portions is configured to generate hash values for the core boot components;
   a third one of said software portions is configured to store the generated hash values in at least one configuration register;
   a fourth one of said software portions is configured to retrieve from a trusted source an expected state of the at least one configuration register storing the generated hash values;
   a fifth one of said software portions is configured to compare the expected state of the at least one configuration register to the stored hash values;
   responsive to the expected state of the at least one configuration register matching the stored hash values, a sixth one of said software portions is configured to retrieve from the trusted source an expected state of a hash value of a hash list;
   a seventh one of said software portions is configured to compare the expected state of the hash value of the hash list to a computed hash value of the hash list;
   responsive to the expected state of the hash value of the hash list matching the computed hash value of the hash list, an eighth one of said software portions is configured to use the hash list to validate core computer system files,
   wherein the core boot components comprise the second one of said software portions.

2. The computer system of claim 1 wherein core boot components include a basic input/output system ("BIOS"), a boot loader, and a, set of operating system primary kernel components, wherein the BIOS comprises the second one of said software portions.

3. The computer system of claim 1 wherein the trusted source is a trusted platform module.

4. The computer system of claim 3 wherein the expected state is sealed into the trusted platform module.

5. The computer system of claim 1 wherein retrieval of the expected state of the hash value of the hash list from the trusted sources validates core boot components of the computer system.

6. The computer system of claim 1 wherein the hash list validates files executed by the computer system.

7. The computer system of claim 1, wherein the fifth one of said software portions is configured to compare the expected state of the at least one configuration register to the stored hash values after the first one of said software portions is executed.

8. The computer system of claim 1, wherein the core boot components further comprise the first one of said software portions and the third one of said software portions.

* * * * *